(12) United States Patent
Tabak

(10) Patent No.: US 12,322,110 B2
(45) Date of Patent: Jun. 3, 2025

(54) GENERATION OF CONCEPTS FOR LANE AND ROAD BOUNDARY PREDICTION

(71) Applicant: AUTOBRAINS TECHNOLOGIES LTD, Tel Aviv-Jaffa (IL)

(72) Inventor: Tom Tabak, Tel Aviv (IL)

(73) Assignee: AUTOBRAINS TECHNOLOGIES LTD, Tel-Aviv (IL)

( * ) Notice: Subject to any disclaimer, the term of this patent is extended or adjusted under 35 U.S.C. 154(b) by 388 days.

(21) Appl. No.: 18/045,820

(22) Filed: Oct. 11, 2022

(65) Prior Publication Data

US 2023/0119374 A1 Apr. 20, 2023

Related U.S. Application Data

(60) Provisional application No. 63/262,388, filed on Oct. 11, 2021.

(51) Int. Cl.
*G06T 7/10* (2017.01)
*G06N 3/08* (2023.01)

(52) U.S. Cl.
CPC ........... *G06T 7/10* (2017.01); *G06N 3/08* (2013.01)

(58) Field of Classification Search
CPC . G06N 3/08; G06N 3/088; G06N 3/09; G06T 7/10; G06V 10/82; G06V 20/588
See application file for complete search history.

(56) References Cited

U.S. PATENT DOCUMENTS

| | | | |
|---|---|---|---|
| 2016/0239969 A1* | 8/2016 | Davatzikos | G06T 7/0016 |
| 2018/0012085 A1* | 1/2018 | Blayvas | G06V 20/58 |
| 2018/0150086 A1* | 5/2018 | Nobukawa | G08G 1/164 |
| 2018/0257660 A1* | 9/2018 | Ibrahim | G01S 5/0027 |
| 2019/0251743 A1* | 8/2019 | Koyama | G09B 21/00 |
| 2020/0101974 A1* | 4/2020 | Ha | H04W 4/024 |
| 2020/0117920 A1* | 4/2020 | Lee | G06T 17/05 |
| 2020/0386567 A1* | 12/2020 | Igarashi | G01C 21/3815 |

(Continued)

OTHER PUBLICATIONS

Alf-Rune Siqveland, "Efficient Annotation of Semantic Segmentation Datasets for Scene Understanding with Application to Autonomous Driving," Sep. 30, 2019, MS thesis,2019, Master in Electronics and Computer Technology Cybernetics, Department of Physics, University of Oslo, spring 2019, pp. 6-20,55-65.*

(Continued)

*Primary Examiner* — Omar S Ismail
(74) *Attorney, Agent, or Firm* — RECHES PATENTS

(57) ABSTRACT

A method for neural network based image processing, the method may include obtaining multiple two dimensional (2D) segments of a sensed information unit, each 2D segment has a segment location within the sensed information unit; converting each 2D segments to a segment vector; generating multiple segments intermediate results by repeating, for each segment vector: (a) concatenating the segment vector with associated segment location information to provide a first segment concatenated vector; and (b) multiplying the first segment concatenated vector by a learnable embedding matrix to provide a segment intermediate result; concatenating the multiple segments intermediate results with associated segment identifiers to provide a sensed information unit result; and feeding the sensed information unit result to a second layer of a neural network.

12 Claims, 4 Drawing Sheets

(56) References Cited

U.S. PATENT DOCUMENTS

2021/0374384 A1* 12/2021 Munkberg ............. G06N 3/045
2021/0401392 A1* 12/2021 Bengtsson ........... A61B 6/5235

OTHER PUBLICATIONS

Shijie Hao et al., "A Brief Survey on Semantic Segmentation with Deep Learning," Apr. 13, 2020, Neurocomputing 406 (2020), pp. 302-317.*

Seyed Majid Azimi et al., "Aerial LaneNet: Lane-Marking Semantic Segmentation in Aerial Imagery Using Wavelet-Enhanced Cost-Sensitive Symmetric Fully Convolutional Neural Networks," Apr. 22, 2019, IEEE Transactions on Geoscience and Remote Sensing, vol. 57, No. 5, May 2019, pp. 2920-2935.*

Hsiang-Yu Han et al., "Using Channel-Wise Attention for Deep CNN Based Real-Time Semantic Segmentation With Class-Aware Edge Information," Feb. 2, 2021, IEEE Transactions on Intelligent Transportation Systems, vol. 22, No. 2, Feb. 2021, pp. 1041-1046.*

\* cited by examiner

GENERATION OF CONCEPTS FOR LANE AND ROAD BOUNDARY PREDICTION

BACKGROUND

Many machine learning processes should process two dimensional images.

Various machine learning natural language processing (NLP) encoders are configured to receive as input vectors.

There is a growing need to provide a machine learning process that can benefit from encoders developed in the NLP domain.

SUMMARY

There is provided a method, a system and/or a non-transitory computer readable medium for neural network based image processing.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
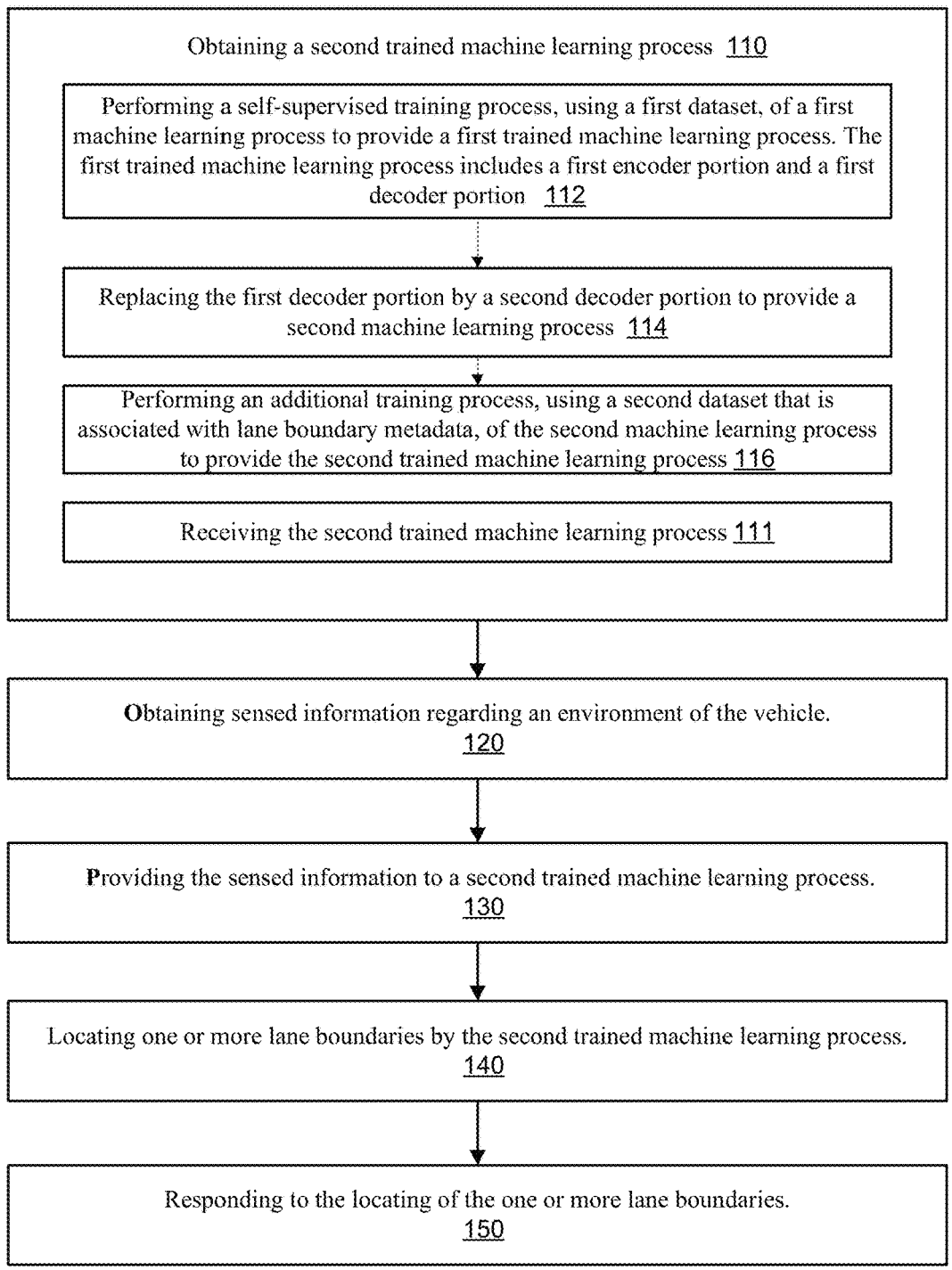
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There is provided a method, a system and/or a non-transitory computer readable medium for machine learning based pre-processing.

FIG. 1 illustrates an example of a method 100 for neural network based image processing.

Method 100 may start by step 110 of obtaining multiple two dimensional (2D) segments of a sensed information unit, each 2D segment has a segment location within the sensed information unit.

Step 110 may be followed by step 120 of converting each 2D segments to a segment vector.

Step 120 may be followed by step 130 of generating multiple segments intermediate results by multiplying each segment vector by a learnable embedding matrix to provide a segment intermediate result.

Step 130 may be followed by step 140 of concatenating the multiple segments intermediate results with associated segment identifiers to provide a sensed information unit result.

Step 140 may be followed by step 150 of feeding the sensed information unit result to a second layer of a neural network.

Step 150 may be followed by step 160 of processing the sensed information result to provide an image processing result.

The segment identifier is indicative of the segment location. This may be a coordinate (for example an x,y coordinate within the image), or may be any value that is associated with such a coordinate or location.

Steps 110, 120, 130, 140 and 150 may be executed by first layer of the neural network.

The first layer may be an input layer of the neural network.

Step 160 may include performing content and location aware processing. Additionally or alternatively—step 160 may be executed by a portion of the neural network that follows the first layer or the second layer.

The neural network may be trained by applying a supervised training process or by applying an unsupervised training process.

Figure 2:
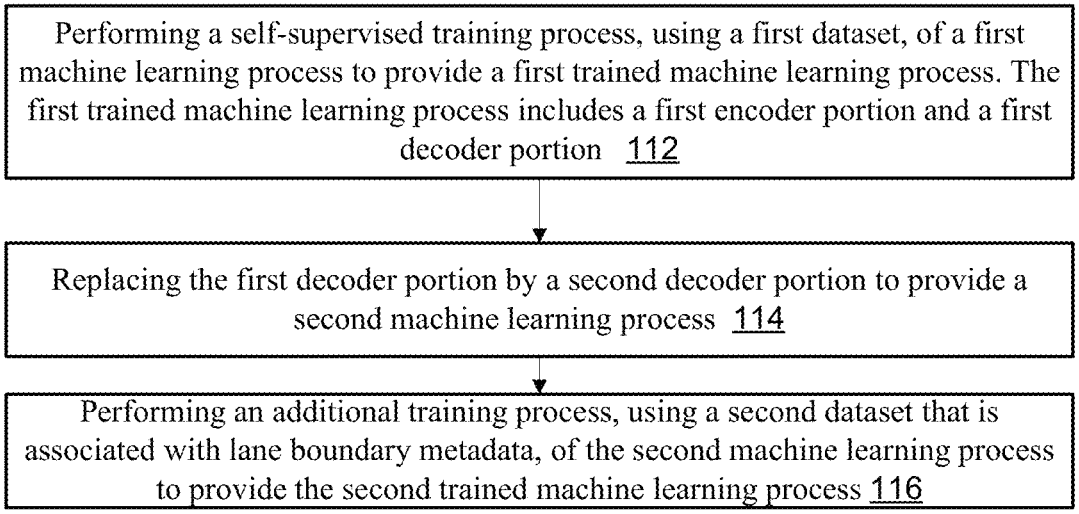
FIG. 2-3 illustrates an example of an image and various data structures.

FIG. 2 illustrates an image and various data structures.

Image 310 includes multiple 2D segments 361(1,1)-361(N,M) that are converted to segment vectors 362(1,1)-362(N,M).

The segments vectors are further processed—and for simplicity of explanation the processing of segment vector 362(1,1) is illustrated.

Segment vector 362(1,1) is transformed to a column segment vector and is multiplied by learnable embedding matrix 370 to provide a segment intermediate result 374(1,1). The segment intermediate result 374(1,1) and the segment identifier (ID1) of segment vector 362(1,1) are concatenated to provide segment intermediate result 376(1,1) that is fed to an encoder.

The process may be repeated for each segment vector out of segment vectors 362(1,1)-362(N,M) to provide segment intermediate results.

Different segment intermediate results may be concatenated or fed to the encoder in any other manner.

FIG. 2 also illustrates a neural network 380 that include a first layer 380(1), a second layer 380(2) and a portion 380(3) that follows the first and second layers.

Figure 3:
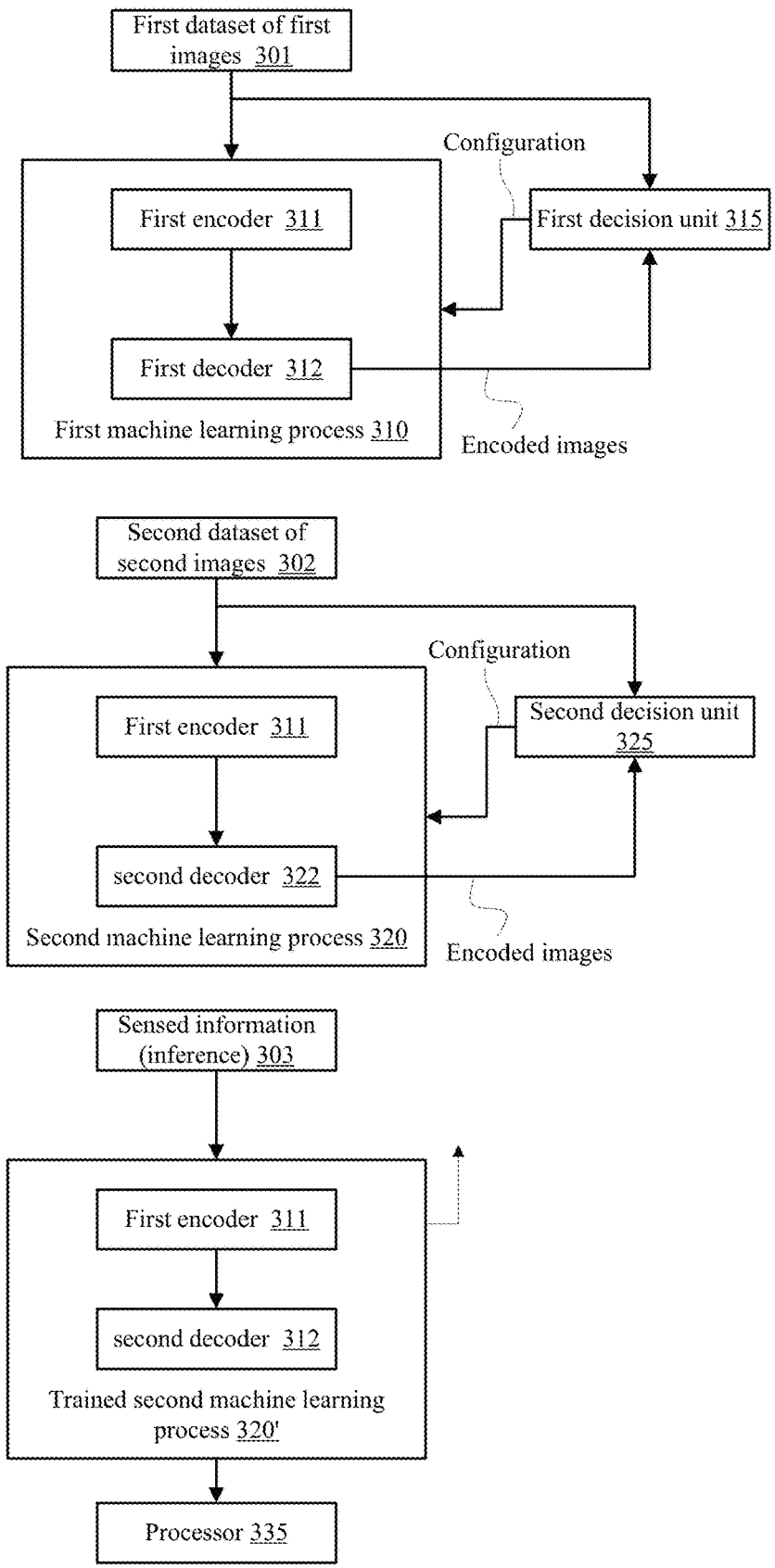
Figure 4:
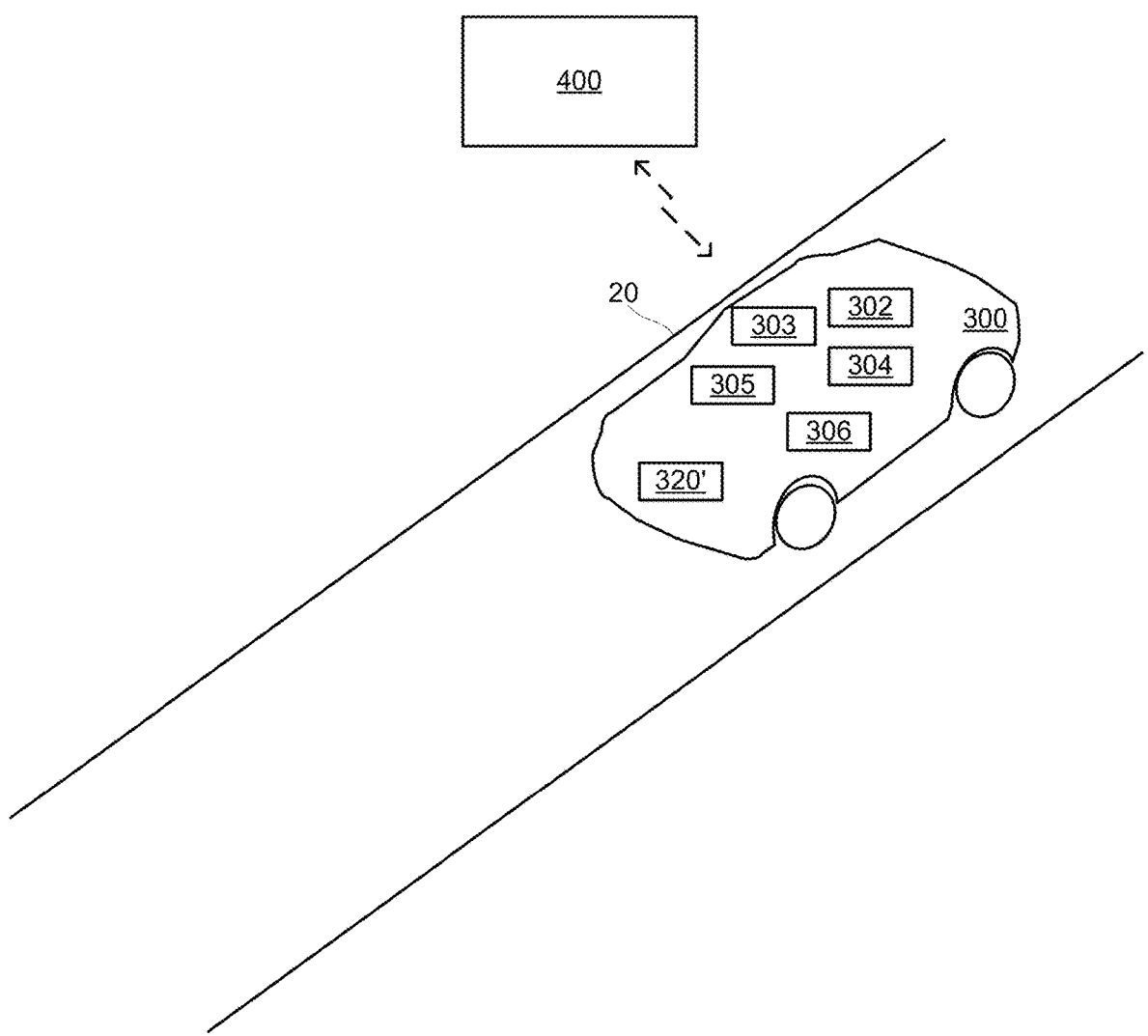
FIG. 4 illustrates an example of a vehicle.

FIG. 3 illustrates metadata a vehicle 201 that include system 200.

System 200 may include visual sensor 220 such as a camera (illustrated as outputting sensed image 308), controller 230, processing unit 240 (that may include (or may be configured to implement) neural network 380), man machine interface such as display 250, memory unit 260, autonomous driving module 270 and ADAS module 280.

The autonomous driving module 270, and ADAS module 280 may respond to lane boundary information generated by the processing unit 240.

The controller 230 may control the operation of the system 200.

System 200 may be configured to execute method 100.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for neural network based image processing, the method comprises:
    obtaining multiple two dimensional segments of a sensed information unit, each two dimensional segment has a segment location within the sensed information unit;
    converting each two dimensional segments to a segment vector;
    generating multiple segments intermediate results by multiplying each segment vector by a learnable embedding matrix to provide a segment intermediate result;
    concatenating the multiple segments intermediate results with associated segment identifiers indicative of the segment location to provide a sensed information unit result, wherein the obtaining, converting, generating and feeding are executed by a first layer of the neural network;
    feeding the sensed information unit result to a second layer of a neural network; and
    performing content and location aware processing by a-portion of the neural network that follows the first layer.

2. The method according to claim 1, wherein the first layer is an input layer of the neural network.

3. The method according to claim 1, wherein the neural network is trained by applying a supervised training process.

4. The method according to claim 1, wherein the neural network is trained by applying an unsupervised training process.

5. A non-transitory computer readable medium for neural network based image processing, the non-transitory computer readable medium stores instructions for:
    obtaining multiple two dimensional-segments of a sensed information unit, each two dimensional segment has a segment location within the sensed information unit;
    converting each two dimensional segments to a segment vector;
    generating multiple segments intermediate results by multiplying each segment vector by a learnable embedding matrix to provide a segment intermediate result;
    concatenating the multiple segments intermediate results with associated segment identifiers indicative of the segment location to provide a sensed information unit result; wherein the obtaining, converting, generating and feeding are executed by a first layer of the neural network;
    feeding the sensed information unit result to a second layer of a neural network; and
    performing content and location aware processing by a portion of the neural network that follows the first layer.

6. The non-transitory computer readable medium according to claim 5, wherein the first layer is an input layer of the neural network.

7. The non-transitory computer readable medium according to claim 5, wherein the neural network is trained by applying a supervised training process.

8. The non-transitory computer readable medium according to claim 5, wherein the neural network is trained by applying an unsupervised training process.

9. An image processor for neural network based image processing, the image processor comprises:
    a neural network that is configured to:
        receive a sensed information unit;
        generate, by a first layer of the neural network, multiple two dimensional segments of a sensed information unit, each two dimensional-segment has a segment location within the sensed information unit;
        convert, by the first layer of the neural network, each two dimensional segment to a segment vector;
        generate multiple segments intermediate results by multiplying each segment vector by a learnable embedding matrix to provide a segment intermediate result;
        concatenate, by the first layer of the neural network, the multiple segments intermediate results with associated segment identifiers indicative of the segment location to provide a sensed information unit result;
        feed the sensed information unit result from the first layer of the neural network to a second layer of a neural network; and
        perform content and location aware processing by a portion of the neural network that follows the first layer.

10. The image processor according to claim 9, wherein the first layer is an input layer of the neural network.

11. The image processor according to claim 9, wherein the neural network is trained by applying a supervised training process.

12. The image processor according to claim 9, wherein the neural network is trained by applying an unsupervised training process.

* * * * *